US011860576B2

(12) United States Patent
Renaud

(10) Patent No.: US 11,860,576 B2
(45) Date of Patent: Jan. 2, 2024

(54) ESCAPEMENT MECHANISM FOR TIMEPIECE

(71) Applicant: François Besse, Nyon (CH)

(72) Inventor: Dominique Renaud, Morges (CH)

(73) Assignee: François Besse, Nyon (CH)

(*) Notice: Subject to any disclaimer, the term of this patent is extended or adjusted under 35 U.S.C. 154(b) by 497 days.

(21) Appl. No.: 17/055,330

(22) PCT Filed: May 14, 2019

(86) PCT No.: PCT/EP2019/062338
§ 371 (c)(1),
(2) Date: Nov. 13, 2020

(87) PCT Pub. No.: WO2019/219679
PCT Pub. Date: Nov. 21, 2019

(65) Prior Publication Data

US 2021/0216042 A1 Jul. 15, 2021

(30) Foreign Application Priority Data

May 16, 2018 (EP) .................................... 18172526
Nov. 1, 2018 (CH) .................................... 01330/18

(51) Int. Cl.
*G04B 15/08* (2006.01)
*G04B 15/14* (2006.01)
*G04B 5/08* (2006.01)

(52) U.S. Cl.
CPC ............... *G04B 5/08* (2013.01); *G04B 15/14* (2013.01)

(58) Field of Classification Search
CPC ................................ G04B 15/08; G04B 15/14
See application file for complete search history.

(56) References Cited

U.S. PATENT DOCUMENTS 2,067,478 A * 1/1937 Cormier ................. G04B 15/08 968/102
10,254,716 B2 4/2019 Renaud
(Continued)

FOREIGN PATENT DOCUMENTS

CH 101849 11/1923
CH 101849 A * 11/1923
(Continued)

OTHER PUBLICATIONS

Illustrated Professional Dictionary of Horology, definition of "regulator" (see http://www.fhs.swiss/berner/?I=en). (Year: 1961).*
(Continued)

*Primary Examiner* — Edwin A. Leon
*Assistant Examiner* — Kevin Andrew Johnston
(74) *Attorney, Agent, or Firm* — NIXON & VANDERHYE

(57) ABSTRACT

The present invention relates to a direct escapement mechanism (1) having an escape wheel (2) provided with a series of peripheral teeth (3), and an anchor (4), having an entry-pallet (10) and an exit-pallet (11) each having a locking plane (10*p*, 11*p*) and also having a fork (43). It also comprises a pin (6) which can be rigidly connected to a regulating organ (5) to cooperate at each alternation of said regulating organ (5) with the fork (43) of the anchor in order to unlock at least partially said anchor from the escape wheel (2) as well as at least one impulse pallet (9) which can be rigidly connected to said regulating organ (5) to cooperate with a tooth (3) of the escape wheel to transmit a direct impulse to said regulating organ (5). Typically, at least the teeth (3) of the escape wheel or one of the entry-pallets or exit-pallets (11) comprises in the extension of said locking plane (10*p*, 11*p*) a inclined plane (3*i*, 10*i*, 11*i*) arranged to provide an indirect impulse to said regulating organ (5)
(Continued)

during a movement of said pallet in the path C of the escape wheel (2) by rotating the anchor (4) on its axis (X3). The invention also relates to a timepiece incorporating such an escapement mechanism.

11 Claims, 12 Drawing Sheets

(56) References Cited

U.S. PATENT DOCUMENTS

| | | | | |
|---|---|---|---|---|
| 2009/0168611 A1* | 7/2009 | Gigandet | ............... | G04B 15/14 368/132 |
| 2015/0124570 A1* | 5/2015 | Cabezas Jurin | ....... | G04B 15/06 368/132 |

FOREIGN PATENT DOCUMENTS

| | | | | |
|---|---|---|---|---|
| CH | 700585 B1 | 9/2010 | | |
| CH | 712288 A1 * | 9/2017 | ............. | G04B 15/08 |
| EP | 1 122 617 B1 | 8/2007 | | |
| EP | 1 983 390 | 10/2008 | | |
| EP | 2 407 830 | 1/2012 | | |
| EP | 2 444 860 A1 | 4/2012 | | |
| EP | 2735540 A1 * | 5/2014 | ............. | B81C 3/001 |
| EP | 3 070 537 | 9/2016 | | |
| FR | 1.009.853 | 6/1952 | | |
| FR | 1 009 853 A | 6/1952 | | |
| JP | 2015-025720 A | 2/2015 | | |
| JP | 2017-521672 A | 8/2017 | | |
| WO | 2016/012281 A1 | 1/2016 | | |

OTHER PUBLICATIONS

International Search Report and Written Opinion of the ISA for PCT/EP2019/062338 dated Jul. 26, 2019, 13 pages.

* cited by examiner

ESCAPEMENT MECHANISM FOR TIMEPIECE

This application is the U.S. national phase of International Application No. PCT/EP2019/062338 filed May 14, 2019 which designated the U.S. and claims priority to EP Patent Application No. 18172526.8 filed May 16, 2018, and CH Patent Application No. 01330/18 filed Nov. 1, 2018, the entire contents of each of which are hereby incorporated by reference.

TECHNICAL FIELD

The present invention relates to the field of watchmaking. It concerns, more specifically, a detached escapement mechanism combining a direct escapement and indirect escapement path.

The invention also relates to a timepiece incorporating such an escapement mechanism.

STATE OF THE ART

Anchor escapements are certainly the most common type of escapement in mechanical watch mechanisms, at least in the so-called detached escapement class. Associated with a regulating organ, typically of the pendulum or sprung balance assembly type, an anchor escapement makes it possible to maintain the oscillations of said regulating organ by transmitting to it by regular impulses, at a determined frequency, a fraction of the mechanical energy of the mechanical energy source of a said watch mechanism, usually comprising at least one barrel spring. At the same time, the escapement also allows the oscillations of the regulating organ to be counted and thus the time to be counted.

Numerous variants of anchor escapements have been proposed in the state of the art and are well known to the man of the art in the field of watchmaking. Their limitations, which are equally well known, are mainly a propensity to disturb the isochronism of the oscillations of the regulating organ due to the successive shocks and friction between the anchor and the regulating organ on the one hand and the anchor and the escape wheel on the other, as well as a low mechanical efficiency, mainly for the same reasons. Indeed, it is usually considered that an anchor-type escapement only transmits a limited amount of the driving force it receives from the driving source to the regulating organ.

Anchor escapements, on the other hand, are praised for their reliable operation and are also self-starting.

Robin-type anchor mechanisms have the advantage of better performance than Swiss anchor escapement mechanisms. The Robin escapement is an escapement that combines the advantages of the detent escapement (high efficiency and direct transmission of energy between the escape wheel and the balance) with those of the anchor escapement (better operating safety). It is a direct impulse escapement from the escape wheel to the balance, the anchor of the escapement mechanism essentially constituting a lever equipped with two locking pallets and which tilts between two extreme locking positions of the escape wheel outside the impulse phases.

However, the angle of lift of the Robin anchor is very small (about 5°) compared to the classical Swiss anchors (about 15°), which makes it difficult to apply the usual solution of securing the latter by guard pin and plate. For this purpose, alternative solutions were proposed in documents EP 1 122 617 B1 and EP 2 444 860 A1 or EP 2 407 830 B1.

However, these Robin escapement mechanisms and associated safety devices are delicate to implement.

Document CH101849 A further describes a self-starting direct detached escapement configuration having at the anchor some locking pallets whose locking planes are configured to interact by a punctual rest of the teeth of the escape wheel on the locking planes, which are tilted in relation to the locking plane of said teeth in case of contact. This configuration is advantageous in that it offers a self-starting capability to the escapement. However, these dragging locks largely impact the efficiency of the escapement and complicate its adjustment as for each locking, an impulse induced of the escape wheel on the pallets of the anchor is also combined necessarily, complementing the main direct impulse to the balance, which reduces particularly the interest and the ease of implementation at a mass industrial scale of this solution.

The present invention aims at offering an anchor escapement which combines the respective advantages of the Swiss anchor escapements or pin-pallets anchor in terms of reliability and self-start and those of the direct impulse escapements, especially of the Robin type, more reliable and allowing a mass industrial implementation of said escapement without major adjustment issues for the watchmaker.

The invention also aims at offering an escapement perfectly protected against impacts and risks of induced stoppage of the regulating organ, even in case of micro-impulses.

Finally, the invention has the purpose of offering a timepiece comprising such an escapement mechanism.

DISCLOSURE OF THE INVENTION

For this purpose, the present invention provides an anchor escapement mechanism according to claim 1, as well as a timepiece provided with such an escapement and defined in claim 10.

The invention therefore offers according to a first object a direct escapement mechanism for a timepiece, having, in a known manner per se by the watchmaker:

- an escape wheel, rotatable about a first axis of rotation and provided with a series of peripheral teeth, each having a locking plane, said teeth defining by their ends during rotation of the escape wheel a circular trajectory C,
- an anchor, rotatable around a second axis of rotation between two end locking positions delimited by pins, said anchor having an entry-pallet and an exit-pallet, each having a locking plane and arranged on the anchor in such a way that each pallet cooperates into abutment on its locking plane with the locking plane of a tooth of the escape wheel in each of said locking positions, said anchor further having a fork,
- at least a pin which can be rigidly connected to a regulating organ pivoting around a third axis of rotation to cooperate at each alternation of said regulating organ with the fork of the anchor in order to unlock at least partially said anchor from the escape wheel, and
- at least one impulse pallet capable of being rigidly connected to said regulating organ to cooperate with a tooth of the escape wheel to transmit a direct impulse to said regulating organ.

However, the escapement mechanism of the invention is characterised by the escapements known in the prior art, as it associates and combines to the conventional track of a direct escapement a portion of indirect escapement track, as in a traditional Swiss anchor escapement. For this purpose, the escapement mechanism of the invention is such that at least each tooth of the escape wheel or at least one of the input or exit-pallets has, in the extension of its locking plane, a inclined plane arranged to offer an indirect impulse to said regulating organ during a movement of said pallet in the path C of the escape wheel by rotation of the anchor on its axis.

The escapement mechanism of the invention has a «hybrid» character resulting from the combination of the tracks of a Swiss anchor escapement, which offers draw and is self-starting, with the track of a direct detached escapement, as for example a Robin type escapement. Thus, the adjustment and the implementation of a direct detached escapement are largely simplified by a «dose» of Swiss anchor escapement track, known, mastered and tested for centuries by watchmakers, without impacting substantially the performance, especially the efficiency, of such a direct detached escapement.

The performance of the escapement according to the invention, especially its efficiency and its low angle of lift are analogous to those of a direct detached escapement of the Robin type as any energy transmission is performed directly from the escape wheel to the balance during the normal operation of the escapement, the input and exit-pallets of the anchor being substantially useful only for the lockings. The micro-impulses inclined planes at the ends of the pallets or of the teeth of the escape wheel are oriented and sized so that they only take part in the self-start of the escapement with the driving torque of the train of a watch movement, in order to transmit the initial impulse without blocking of the teeth of the wheel plane on plane with the lockings of the input-exit-pallets. Furthermore, the lockings are of plane on plane ones, without friction nor parasitic dragging impulse, this with a significant loss of energy such as the one described in CH 101 849A.

According to a particular characteristic of the invention, the ends of said inclined plane delimit in relation to said axis of rotation of the anchor an angle β, which is advantageously comprised between 0.5 and 5°, preferably between 0.5 and 2°. Furthermore, said inclined plane extends in a secant direction forming an acute angle i comprised between 30° and 70°, preferably between 40° and 60°, more preferably around 50° with said locking plane. These angular arrangements allow advantageously to ensure the interaction, when the escapement is at a dead centre, of at least a tooth of the escape wheel with at least one of the locking pallets of the anchor on one of the inclined planes of micro-impulses in order to induce a sufficient impulse to start the escapement with the simple driving torque of the movement to which the escapement is associated.

According to a particular characteristic of the invention, the fork comprises two horns separated by a notch and is devoid of a guard pin or the like. The anti-overbanking safety provision of the anchor in relation to the regulating organ is advantageously provided by the arrangement of said horns of the fork symmetrical relative to a straight line passing through the axis of rotation of the anchor and the centre of the notch and extending from said notch following an arc of a circle having a radius of curvature R1, slightly greater than the turning radius of the pin, and having at their free end a stud or finger protruding perpendicularly to the median plane of the anchor in which the horns extend.

In a complementary way to the horns of the anchor thus made, the mechanism also comprises according to a specific embodiment a circular flange which can be attached to said regulating organ, said flange being centred on the axis of rotation of said regulating organ, the pin being embedded in said flange in such a way that it moves without contact along an internal face of said horns during the locking phases of the escape wheel.

In practice, the flange, whose geometry may vary, aims at offering a contact surface with the studs in case of impact during the additional arc of the regulating organ, said studs then coming into abutment either on the inside or on the outside of said flange.

Preferably, the radius of curvature R1 is comprised between 0.5 and 1.5 cm.

In a specific embodiment, said flange has bevelled free ends in a vertical plane, or curved.

A second object of the present invention also concerns a timepiece having an escapement mechanism such as the one previously described, arranged to cooperate with a regulating organ attached to said pin and said impulse pallet.

According to some embodiment variants, the timepiece of the invention may comprise a regulating organ of the sprung balance type or the resonator type mounted to move rotatably on a virtual pivot with knives.

BRIEF DESCRIPTION OF THE DRAWINGS

Other details of the invention will become clearer on reading the following description, with reference to the attached drawings in which.

MODES OF CARRYING OUT THE INVENTION

The present invention offers an detached escapement mechanism 1 of a new type, designed and arranged pour utilize and combine, in a detached escapement with direct impulses, the advantages associated to reliability, simplicity of adjustment and self-start of a Swiss anchor escapement well known by matchmakers for several decades.

Figure 1:
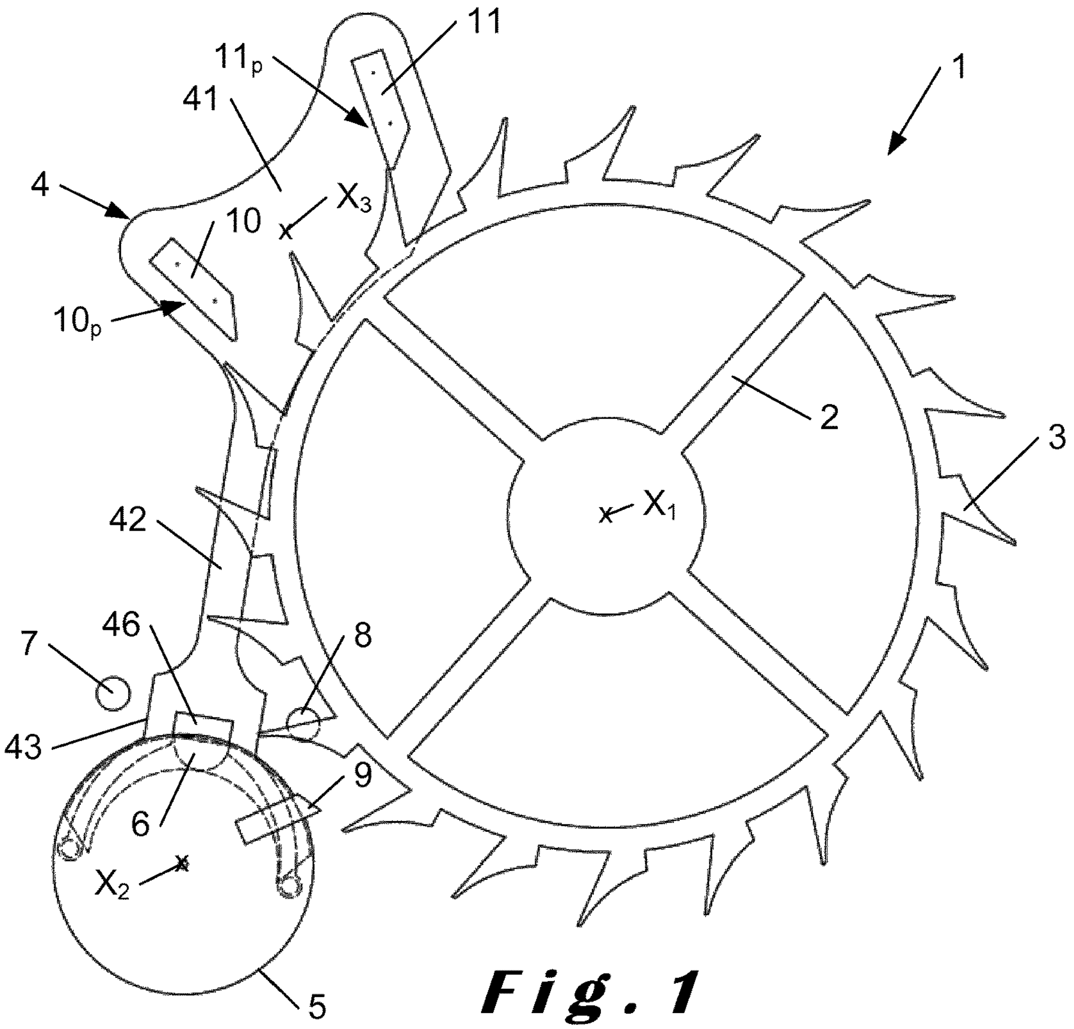
FIG. 1 shows an escapement mechanism according to the invention and an associated regulating organ such as a balance represented schematically, in a position called «dead centre», without impulse or locking.

A particular embodiment of such an escapement mechanism 1 is represented on FIG. 1, corresponding to the dead centre of the escapement 1. Generally speaking, the escapement mechanism 1 is structurally similar to a Robin type escapement but several aspects are modified, as it is described below. The escapement mechanism comprises a escape wheel 2 provided with pointed teeth 3 and mounted to be rotatable around a first axis of rotation X1. Conventionally, this escape wheel 2 is associated to a escape-pinion (not shown) through which the escape wheel 2 is coupled to the finishing gear train and the drive source of a watch movement, for example a barrel spring, which transmits a driving torque to the escape wheel 2, which the latter distributes sequentially to a regulating organ 5 mounted to be rotatable around a second axis of rotation X2, in cooperation with an anchor 4, itself rotatable around a third axis of rotation X3, the axes of rotation X1, X2, X3 being parallel between each other. The regulating organ 5 can be made of a sprung balance well known by watchmakers or any other oscillating regulating organ, as for example a resonator with knives such as the one proposed by the applicant in patent application WO 2016/012281.

The anchor 4 acts as a lever and comprises a plate 41 on which an entry-pallet 10 and an exit-pallet 11 are arranged, each presenting a locking plane 10*p*, 11*p* designed to form alternatively a locking surface in abutment for the teeth 3 of the escape wheel 2 in two end positions in rotation of the anchor 4 around its axis X3, called locking positions. In order to enable the pivoting of the anchor 4 from a locking position to the following one, said anchor comprises a fork 43 arranged at the end of an arm 42 extending from the plate 41 following a straight line linking the axis of rotation X3 of the anchor 4 with the axis of rotation X2 of the regulating organ 5. The fork 43 comprises two horns 44, 45 separated by a notch 46 and devoid of guard pin, finger, or analogous anti-overbanking safety element. These horns 44, 45 are symmetrical in relation to the straight line linking at the dead centre, the axis of rotation X3 and the axis X2 of the regulator, which passes also by the centre of the notch 46. Thanks to this fork 43, the anchor 4 cooperates, more particularly at the level of its notch 46, with a pin 6 mounted together with the regulating organ 5, for example with a coaxial plate of said regulating organ 5 and with which a direct impulse pallet 9 is further joined, which is propelled, at each alternation of the regulator 5, by a tooth 3 of the escape wheel 2. The travel of the anchor is limited by two pins 7, 8 which limit the angle A of the anchor 4 travel between 5 and 6° in relation to the axis X3 of the anchor 4.

Figure 2:
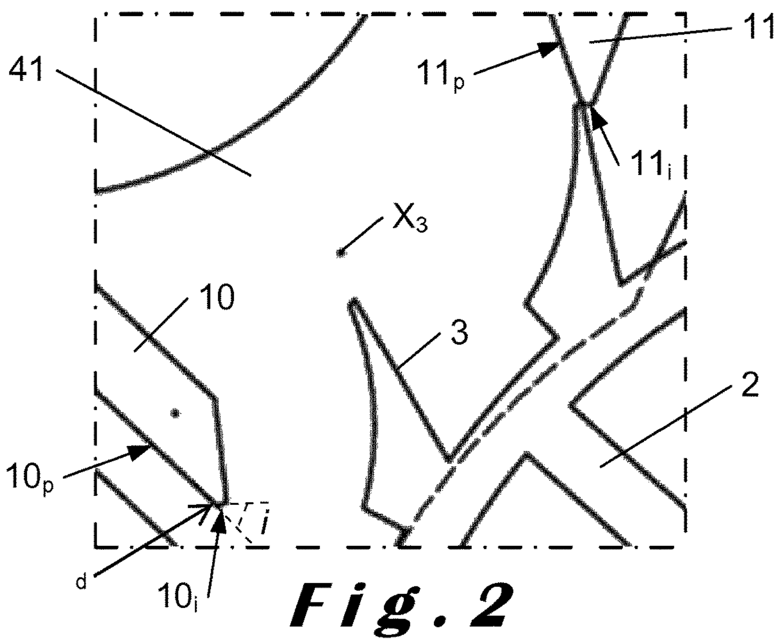
FIG. 2 represents an enlargement of the end of a locking pallet of the escapement mechanism anchor of FIG. 1.
Figure 3:
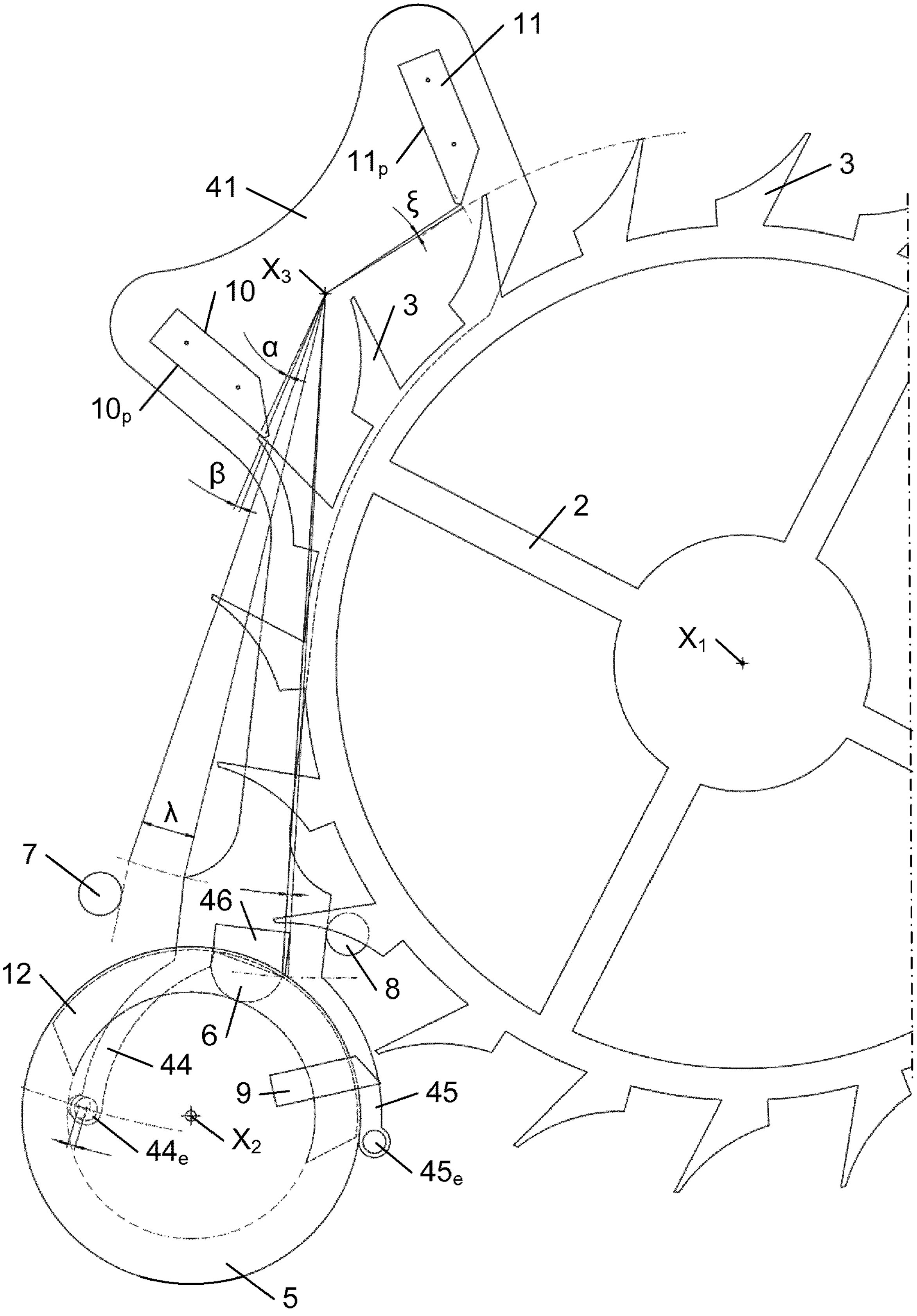
FIG. 3 shows an enlargement of the escapement mechanism of FIG. 1, the various angles determining the self-start condition of the escapement according to the construction of the mechanism of the invention.

According to the invention, and as shown in detail on FIGS. 2 and 3, the entry-pallet 10 and the exit-pallet 11, in any case at least the exit-pallet 11, comprise, in the extension of their respective locking plane 10*p*, 11*p*, a inclined plane of indirect impulse 10*i*, 11*i* arranged to transmit an indirect micro-impulse to the regulating organ 5 when said pallets 10, 11 cross the path C defined by the end of the teeth 3 of the rotating escape wheel 2, during the rotation of the anchor 4 on its axis X3 between the two locking positions. These inclined planes 10*i*, 11*i* are advantageously formed on the locking pallets 10, 11 so that an angle β, so-called micro-impulse, of a value comprised between 0.5° and 5°, more particularly in the example represented between 1° and 2°, preferably around 1.5° is formed between its ends and the axis of rotation X3 of the anchor 4. In addition, the indirect impulse planes 10*i*, 11*i* are arranged in the continuity of the locking plane 10*p*, 11*p* with an inclination according to an acute angle i; in practice in the range of 30° at 70°, preferably between 40° and 60°, preferably in the range of 50°, in relation to said locking plane 10*p*, 11*p*. Thus, the indirect micro-impulse planes 10*i*, 11*i* provide a local break or recess d, in the extension and at the end of the locking planes 10*p*, 11*p*, whose length is determined according to the micro-impulse angle β, calculated and adapted to ensure the automatic start of a regulating organ associated to the escapement 1 under the driving force of the gear after the stoppage of said regulating organ. Advantageously, the locking planes 10*p*, 11*p* of the pallets 10, 11 and of the teeth 3 are such that they rest plane on plane in a locking position of the escapement. In addition, the centre distance between the pivot of anchor X3 and the pivot X1 of the escape wheel 2 is adjusted so that at the dead centre of the escapement, the free end of the teeth 3 of the escape wheel bears by its locking plane substantially on the recess point d, in order to guarantee that the mere driving torque induces a sufficient draw to tip said end of the tooth 3 on the micro-impulse plane 10*i*, 11*i* after the stoppage of the regulating organ 5.

In addition, the entry and exit pallets 10, 11 of anchor 4 are advantageously adjusted on the plate 41 in such a way that the locking and unlocking functions of the anchor in relation to the escape wheel 2, as well as the travel security of the latter in relation to said pallets are optimised. With reference to FIG. 2, pallets 10, 11 are therefore arranged so that in the locking positions a first pallet is in contact with a tooth 3 of the escape wheel on its locking plane on a distance defining a locking angle α in the range of 2° at the axis of rotation X3 of the anchor while the other pallet is moved away from circle C of the escape wheel by a distance forming a security angle ε at the passage of the teeth 3 in the range of 1.5° at the axis of rotation X3.

In addition, pallets 10, 11 ensure by their configuration and arrangement a slight draw, their inclined planes 10*i*, 11*i* offering a self-starting capability to the mechanism of the invention and the micro-impulse at each alternation, distinctive feature of a Swiss anchor escapement.

In concrete terms, it is required for the mechanism 1 to start by itself under the torque of the escape wheel 2 that, from the locking position, the travel up to the dead centre (thus the half-angle of the anchor total movement) positions a inclined plane in the path C and not on a locking area. In addition, the passage from a pallet to another also requires that the pallet-escapement security be smaller than the half-angle of the travel of the anchor 4. Thus, an essential condition of the mechanism of the invention is defined in the following manner:

$$\frac{\lambda}{2} - \varepsilon \leq \beta$$

Thus, a combined or united track escapement between a Swiss anchor escapement and a Robin type direct escapement is actually obtained.

Figure 22:
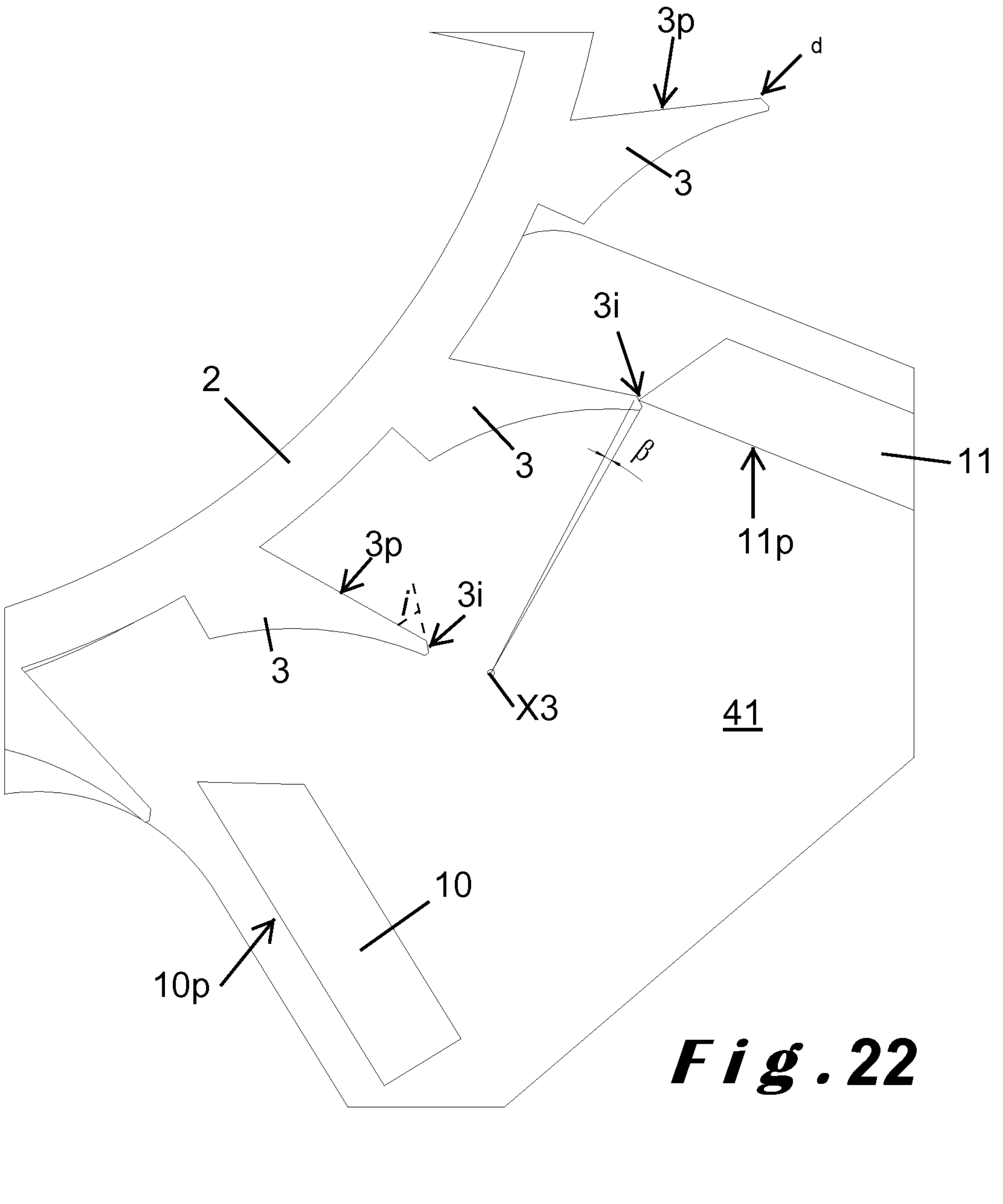
FIG. 22 shows an enlargement of the end of a tooth of the escape wheel in another embodiment of the escapement mechanism of FIGS. 1 to 21.

In another embodiment of the invention represented in FIG. 22, the indirect impulse inclined plane can be provided not on the one of the entry-pallets 10 or exit-pallets 11 of the anchor 4 of the escapement mechanism 1, of the Swiss anchor escapement type, but directly at the free radial end of the teeth 3, in the form of a inclined plane 3*i* similar to the inclined plane 10*i*, 11*i* of the pallets 10, 11 on FIGS. 2 and 3 of the pin escapement type and forming therefore a micro-impulse angle β, of a value comprised between 0.5° and 5°, more particularly in the example represented between 1° and 2°, in relation to the axis X3 of the anchor. The micro-impulse inclined plane 3*i* is provided at the free end of the tooth 3, in the continuity of its locking plane 3*p* but it is inclined according to an acute angle i, in practice in the range of 30° at 70° in relation to said locking plane 3*p*, preferably between 40° and 60°, more preferably in the range of 50°. Thus, the indirect micro-impulse planes 3*i* provide a local break or recess d, in the extension and at the end of the locking plane 3*p*, whose length is determined according to the micro-impulse angle β, calculated and adapted to ensure the automatic start of a regulating organ associated to the escapement 1 under the driving force of the gear train after the stoppage of said regulating organ. Advantageously, the locking planes 10*p*, 11*p* of the pallets 10, 11 and of the teeth 3*p* are such that they rest plane on plane in a locking position of the escapement. In addition, the centre distance between the pivot of anchor X3 and the pivot X1 of the escape wheel 2 is adjusted so that at the dead centre of the escapement, the free end of the teeth 3 of the escape wheel rests by its locking plane substantially on the recess point d, in order to guarantee that the mere driving torque induces a sufficient draw of pallets 10, 11 to tip said end of the tooth 3 on the micro-impulse plane 3*i* after the stoppage of the regulating organ 5.

The pallet 9 may also have an end shape adapted to receive and cooperate with the inclined plane 3*i* of the tooth 3 during the direct impulse in order to transmit a substantially constant torque.

To avoid the overbanking or butting risks observed with the securities of the guard pin type like in the Robin escapement, the escapement mechanism 1 of the invention offers an anti-overbanking security device formed in a united way on the fork 43 of the anchor 4 and on the regulating organ 2, more particularly a flange made integral with the regulating organ 5. As previously indicated, the fork 43 of the anchor 4 is devoid of guard pin between its horns 44, 45. Indeed, the little angular path λ travelled by the anchor 4 does not allow to consider as it is initially planned in the Robin escapement, the implementation of such a guard pin cooperating with a safety-roller according to the usual shape of a Swiss anchor escapement for example, the adjustment difficulty of the escapement to avoid risks of butting being too significant to make the escapement viable at an industrial level. As a replacement, the fork 43 of the anchor 4 of the mechanism 1 according to the invention comprises two horns 44, 45 symmetrical in relation to a straight line passing by the axis of rotation X3 of the anchor and the centre of the notch 46 and which extend from said notch 46 following an arc of a circle having a radius of curvature R1, advantageously comprised between 0.5 and 1.5 cm or in a more empirical manner slightly greater than the turning radius of the pin 6 integral with the regulating organ 5 in relation to its axis of rotation X2. Said horns 44, 45 further comprise at their free end a cylindrical stud or finger 44*e*, 45*e* protruding perpendicularly to the median plane of the anchor 4, in which the plate 41, the arm 42 and the fork 43 extend. The studs could however also have another geometry. The horns 44, 45 thus form a guiding body for said pin 6 during the locking phases on the total angular amplitude in rotation of the regulating organ 5 if it is reduced and the oscillation frequency is important or almost the total additional arc in rotation of said regulating organ 5 if it is of the classical sprung balance type.

In a complementary way to the horns 44, 45, the anti-overbanking device also comprises a circular flange 12 extending on both sides of the pin 6 on the regulating organ 5. Said flange 12 is centred on the rotation axis X2 of the regulating organ. Thus, the pin 6 being is integrated in said flange so that it moves, normally without contact, along an internal face of said horns during the locking phases of the escape wheel 2. The total length of the flange 12 is preferably substantially equal to the total distance between the studs 44*e*, 45*e* of said horns 44, 45.

Figure 16:
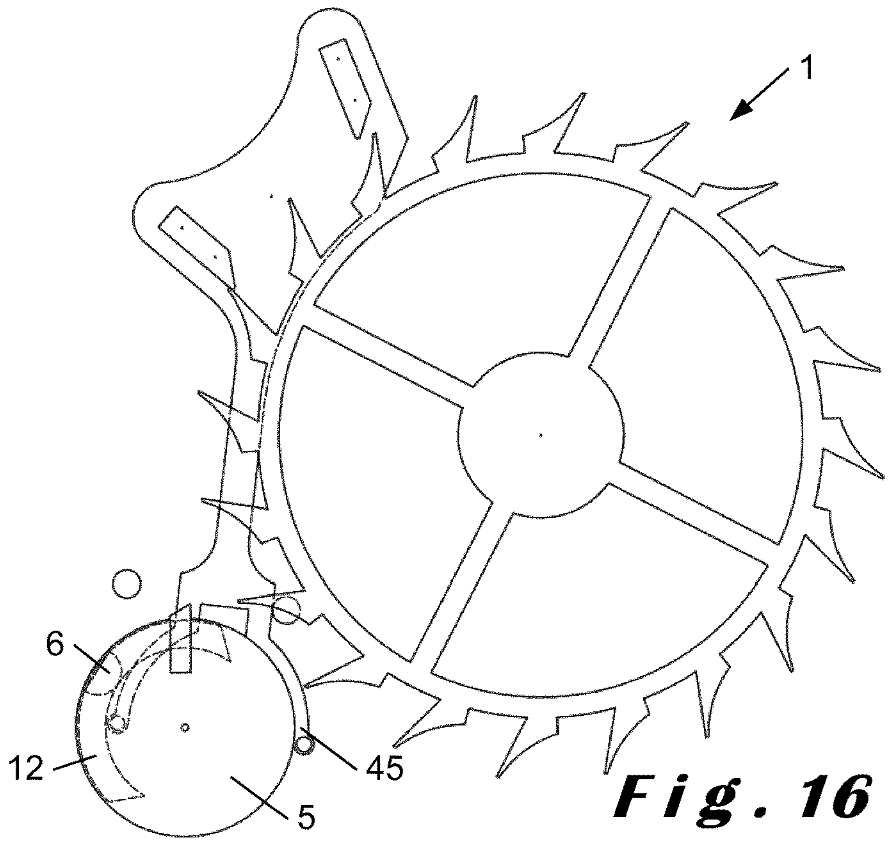
Figure 17:
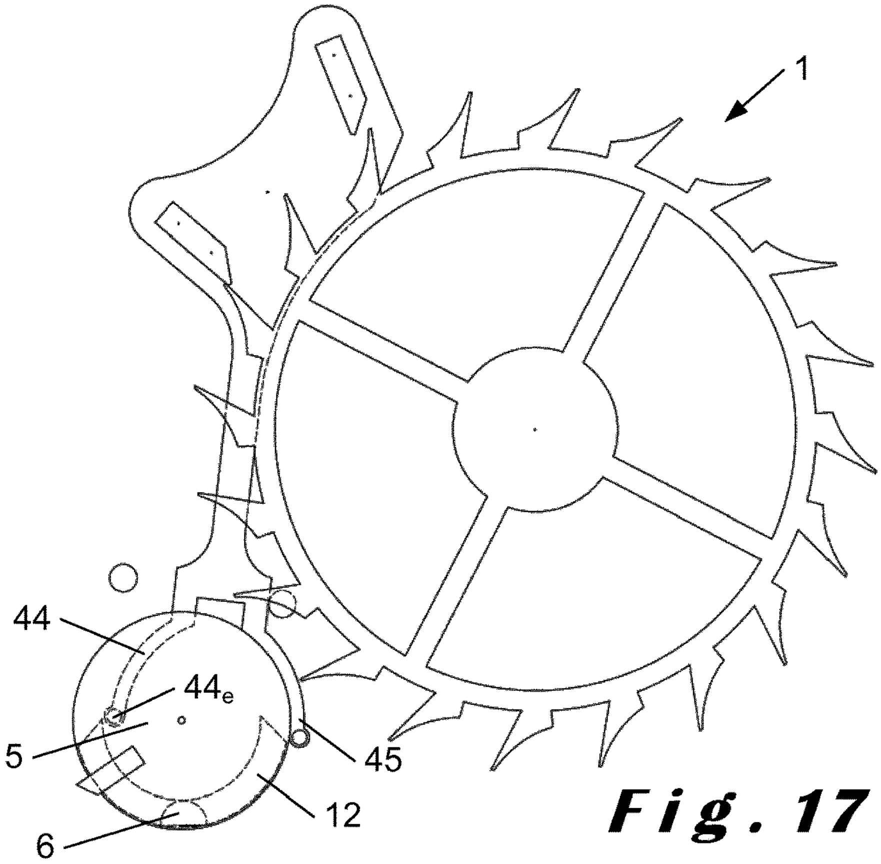
FIGS. 17 to 21 show different attachment positions of the anti-overbanking device of the escapement mechanism of the invention during two successive alternations.
Figure 18:
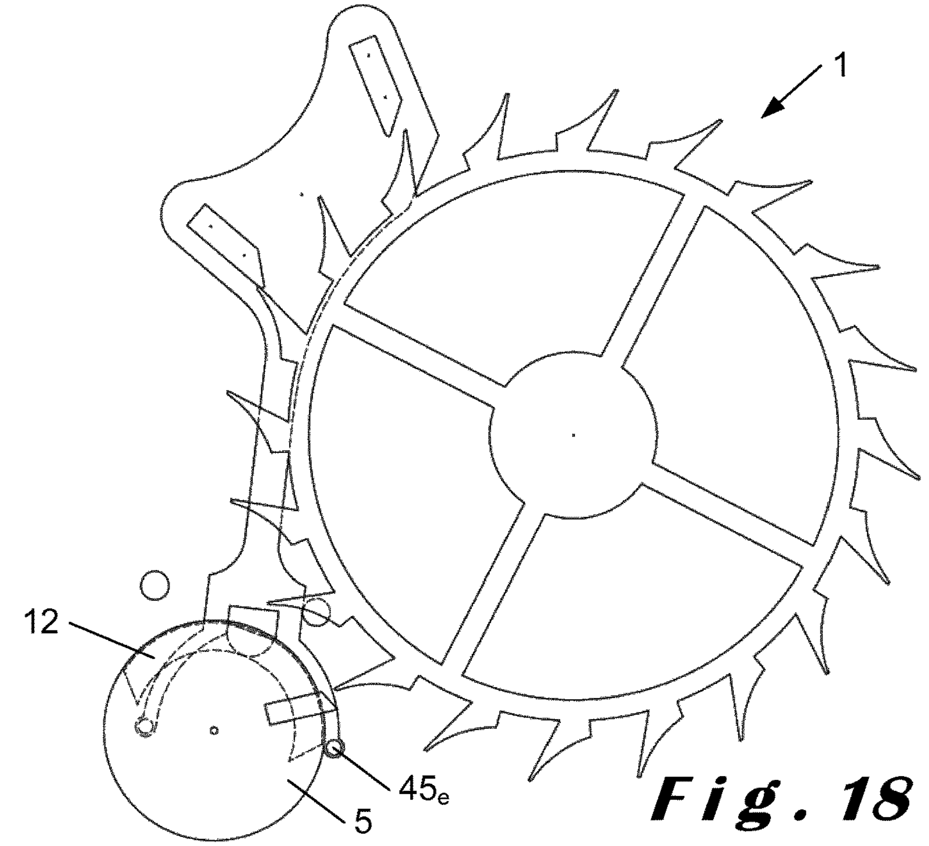
Figure 19:
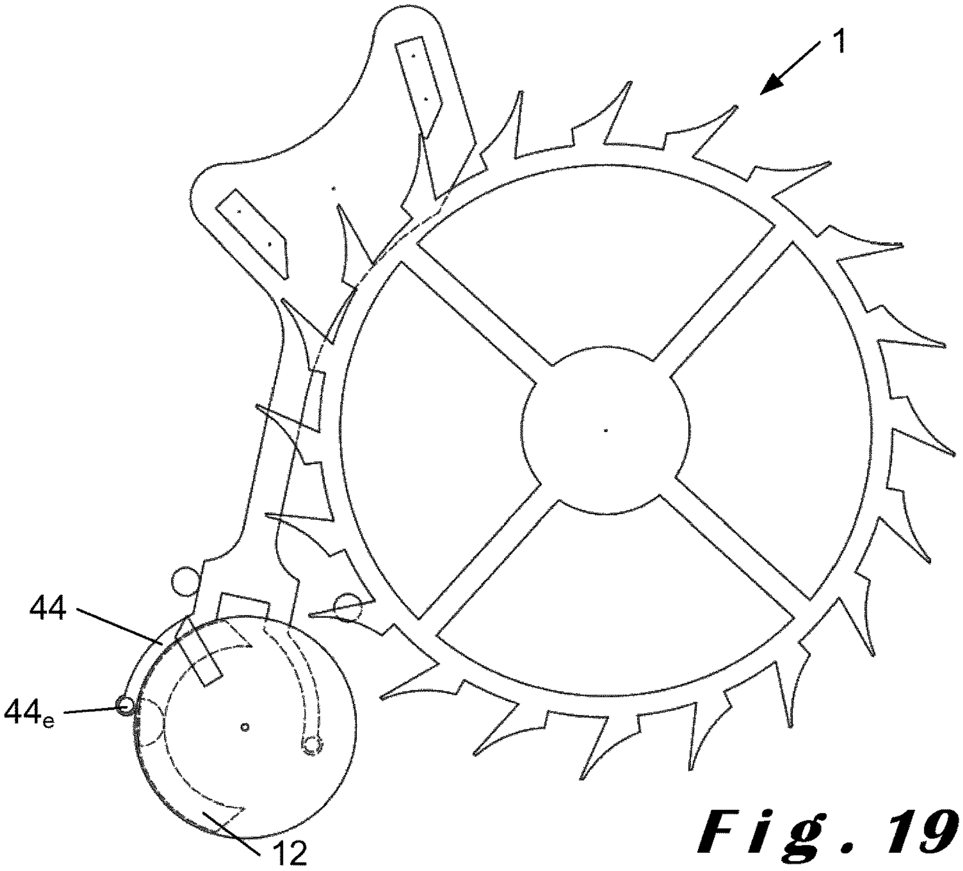
Figure 20:
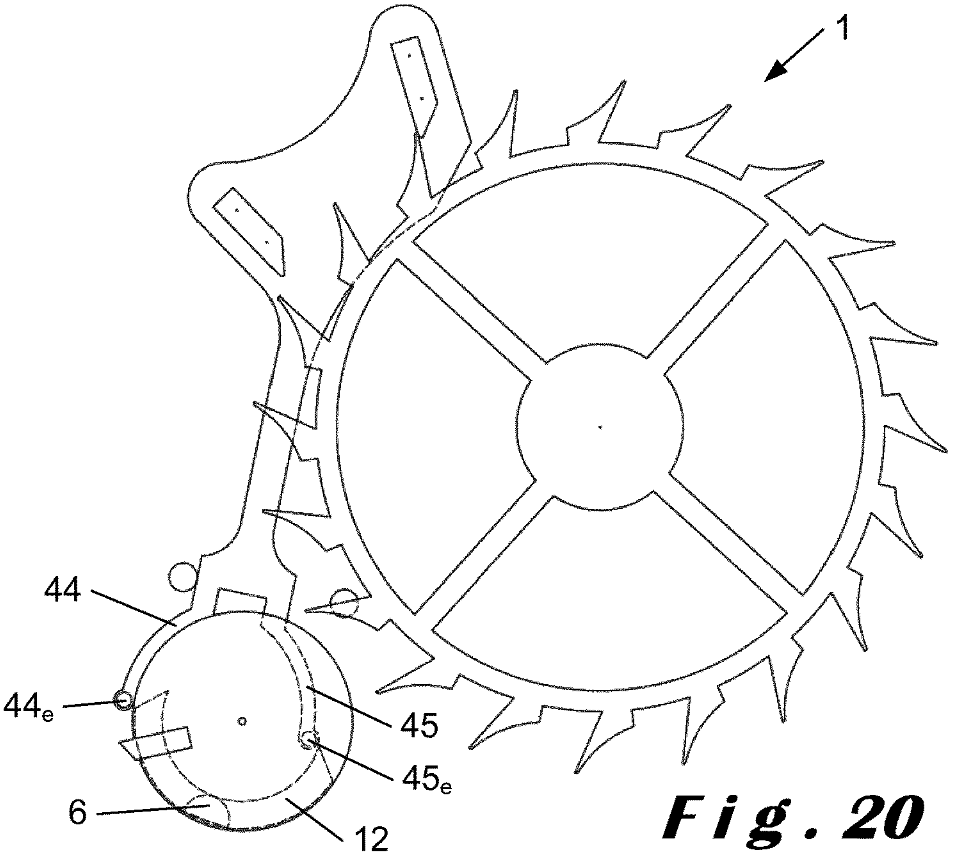
Figure 21:
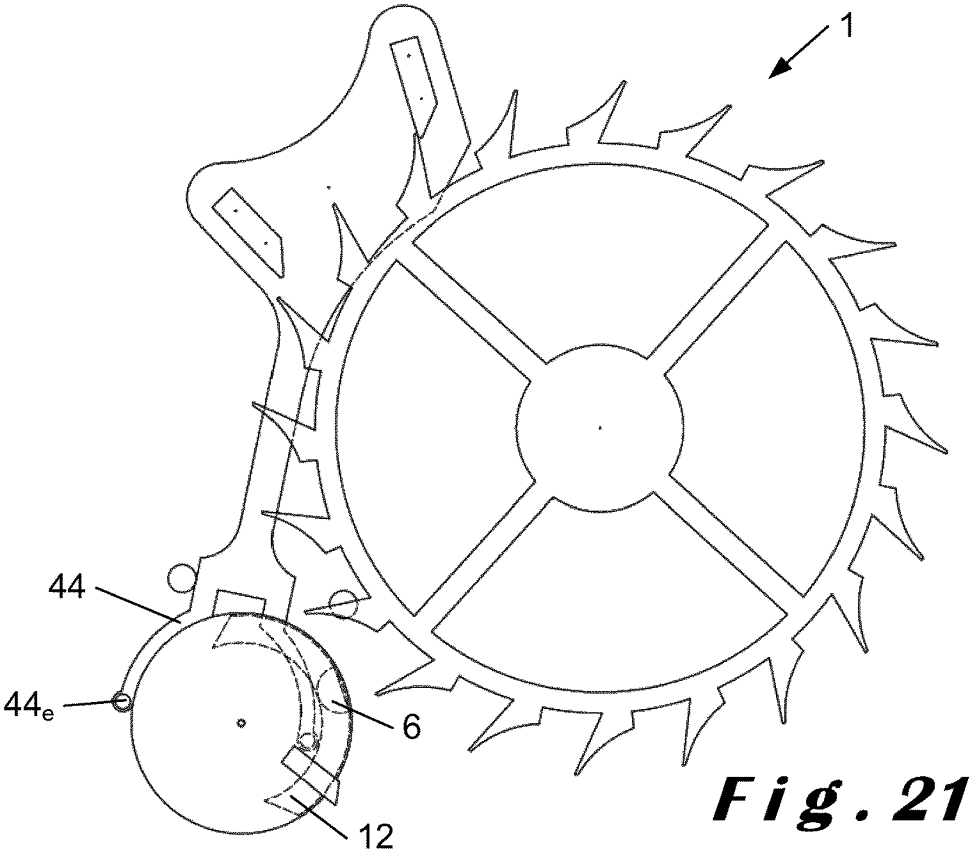

Thus, in case of impact on the mechanism 1 generating a movement of the anchor 4 prone to overbanking during the additional arc of the regulating organ, a stud 44*e* or 45*e* passes on the lower surface of the flange 12 but this does not entail a stoppage because the regulating organ 5 continues to rotate beyond this internal face of the flange 12 against the stud 44*e*, 45*e* as represented in FIGS. 16, 17 and in FIGS. 19, 20 on two distinct alternations. In addition, the returns (FIGS. 18, 21) of the flange 12 and of the pin 6 between the horns in a normal operational configuration are ensured by the free ends of the flange 12 which are advantageously bevelled in a vertical plane in order to yield the passage to said studs 44*e*, 45*e* to come back between the horns 44, 45 after having possibly tipped on the outside of the horns during the previous alternation. This arrangement and conformation of the horns 44, 45 and of the flange 12 therefore offer an optimal security against a possible overbanking, without disrupting negatively the operation of the escapement mechanism 1.

Figure 4:
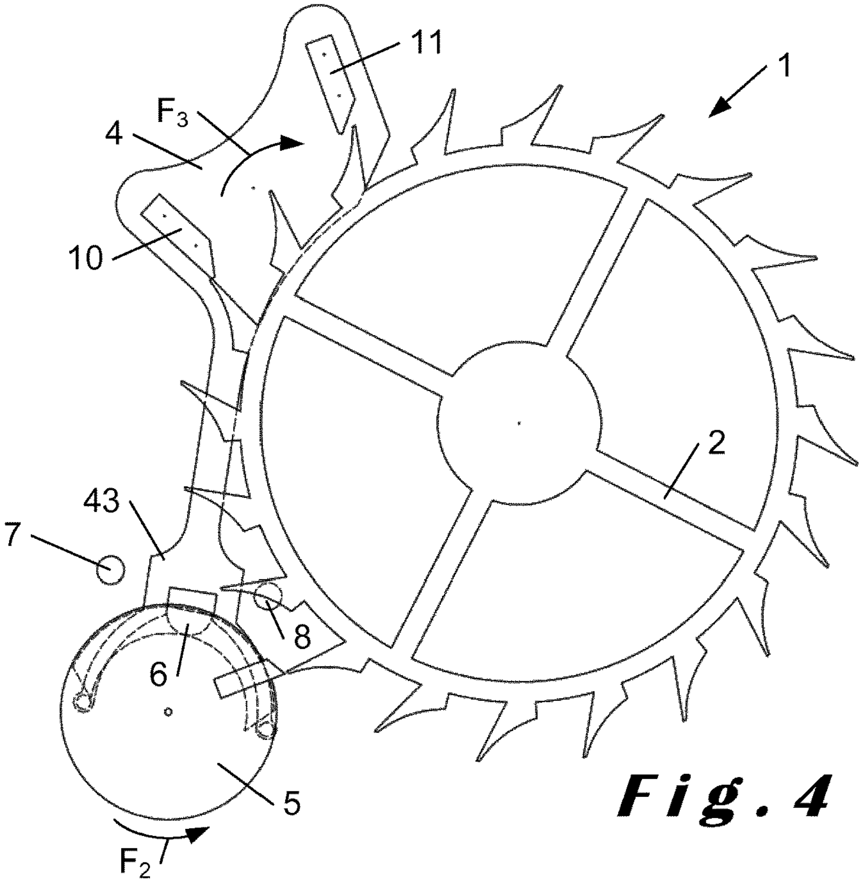
FIGS. 4 to 9 show the various operational phases of the escapement mechanism according to the invention on a first alternation.

FIGS. 4 at 15 show the different operational phases of the escapement mechanism of the invention on two successive alternations of the regulating organ 5, the respective rotation directions of the escape wheel 2, of the anchor 4 and of said regulating organ being represented by the arrows F1, F2, F3 on a first alternation respectively and the arrows F4, F5, F6 on a second alternation, respectively.

Figure 5:
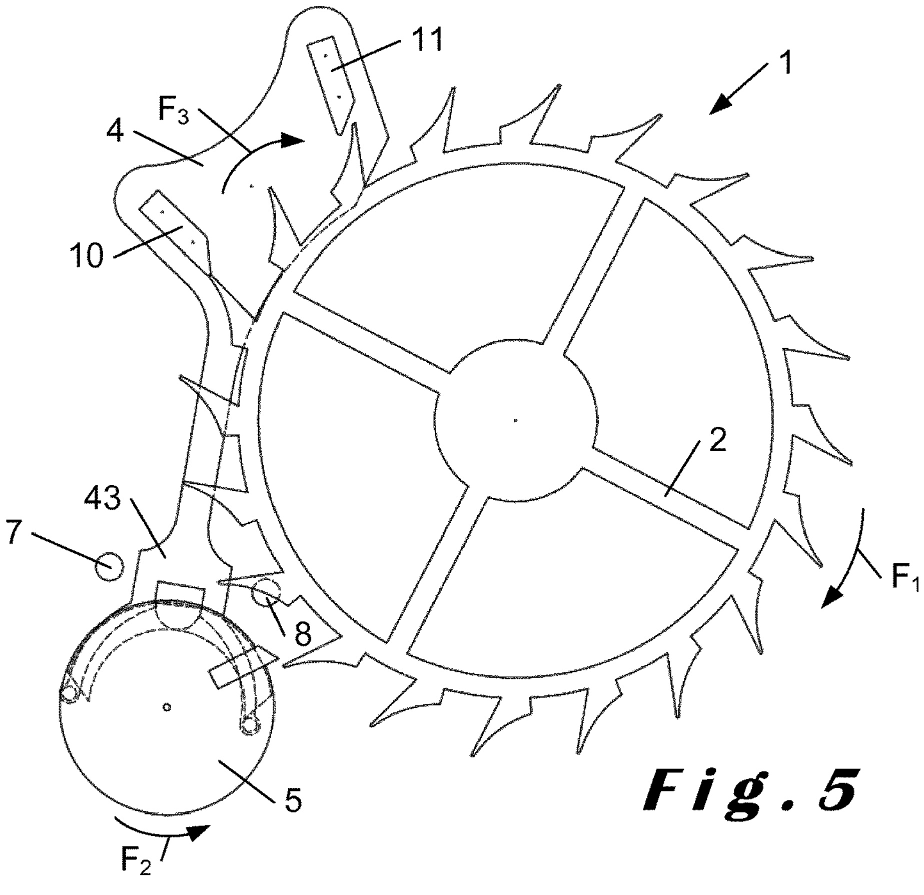
Figure 6:
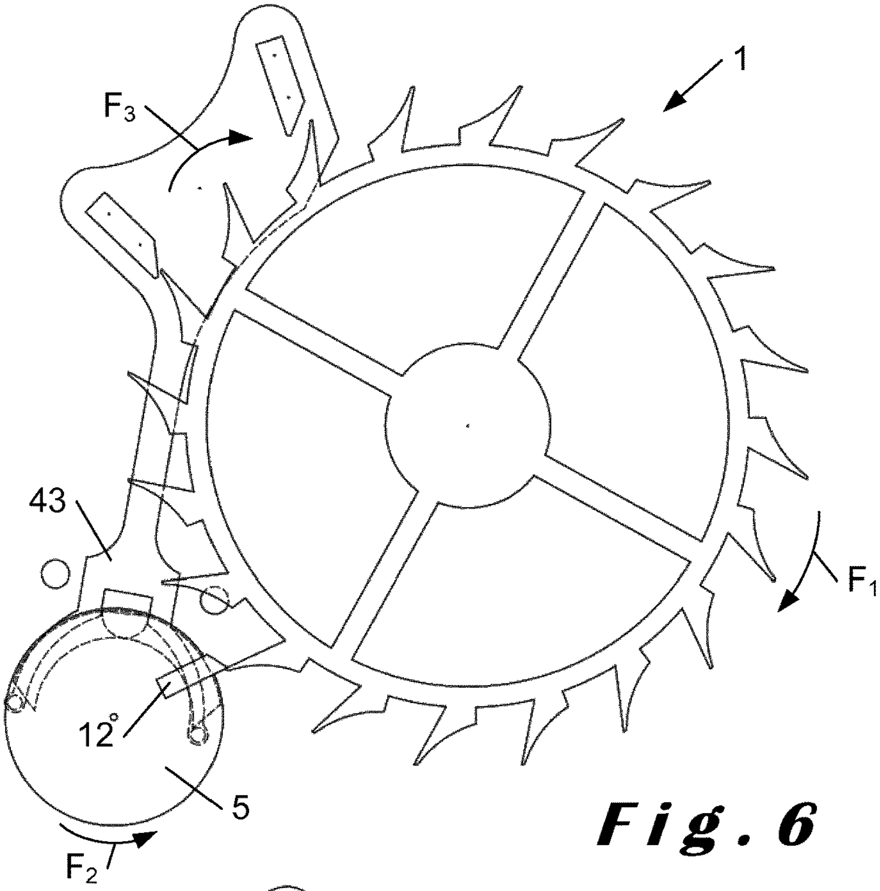
Figure 7:
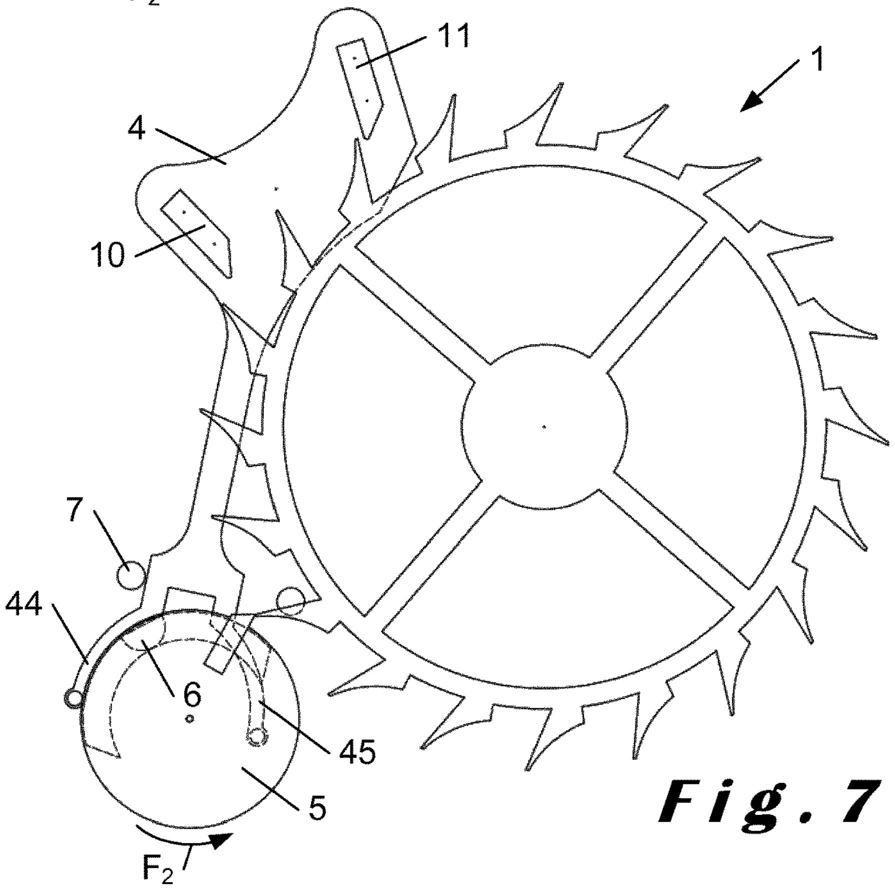
Figure 8:
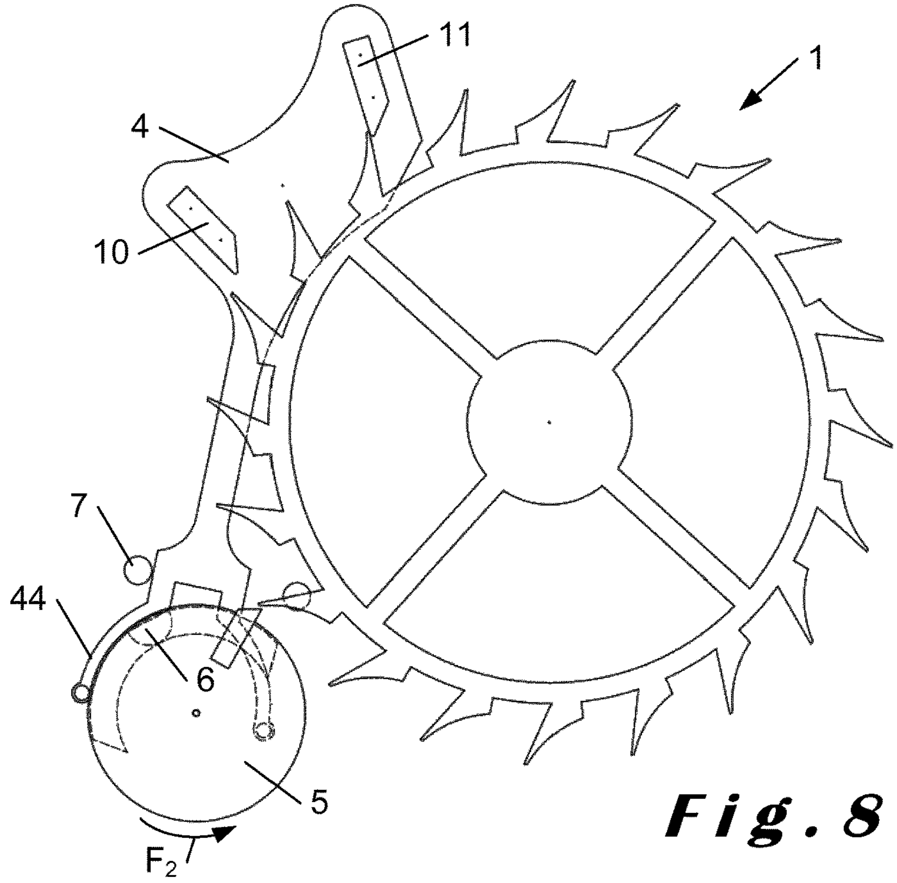
Figure 9:
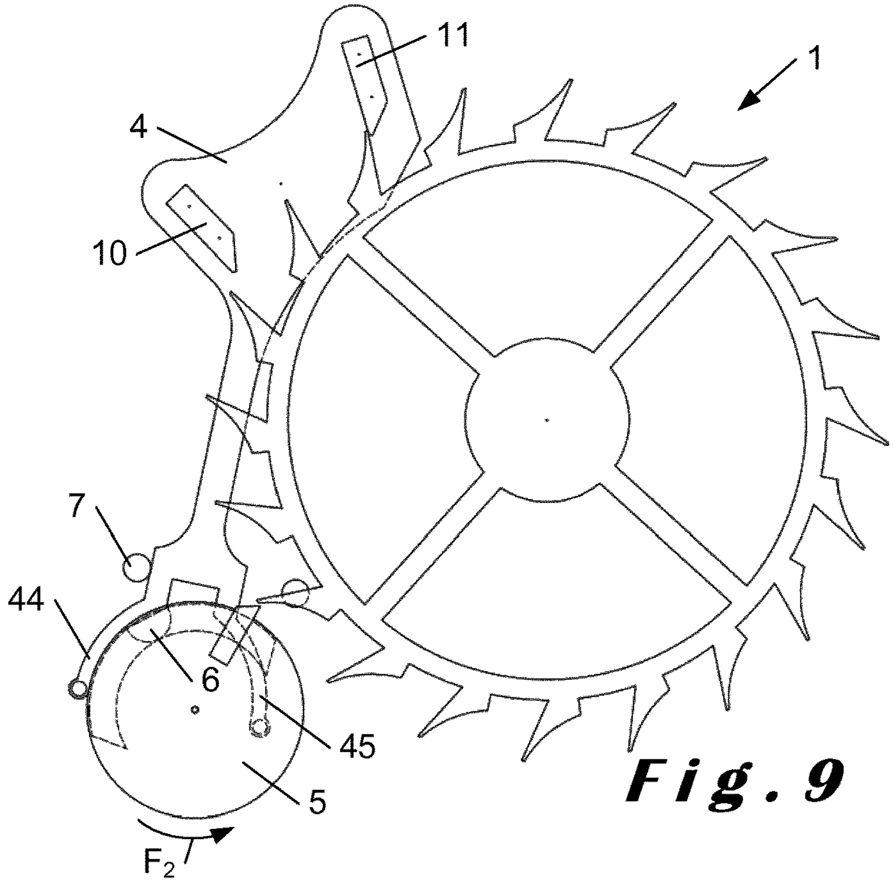

FIG. 4 shows the mechanism 1 in an unlocking position. The pin 6 is in the notch 46 of the fork 43 of the anchor 4 and under the rotating action of the regulating organ 5 in the F3 direction, it leaves the rest against the pin 8 in the F2 direction, passing by the dead centre halfway (FIG. 1) to arrive (FIG. 5) in an indirect micro-impulse position via the entry-pallet 10. Then, the regulating organ 5 receives (FIG. 6) its direct impulse at pallet 9 by the escape wheel after which (FIG. 7) the fork drops (FIG. 8) against the pin 7 and the anchor 4 is in a locking position, a tooth 3 of the escape wheel 2 resting on the locking plane of the exit-pallet 11. The regulating organ 5 then travels along its additional arc (FIG. 9) and the anchor 4 undergoes a draw via its exit-pallet 11 against the pin 7.

Figure 10:
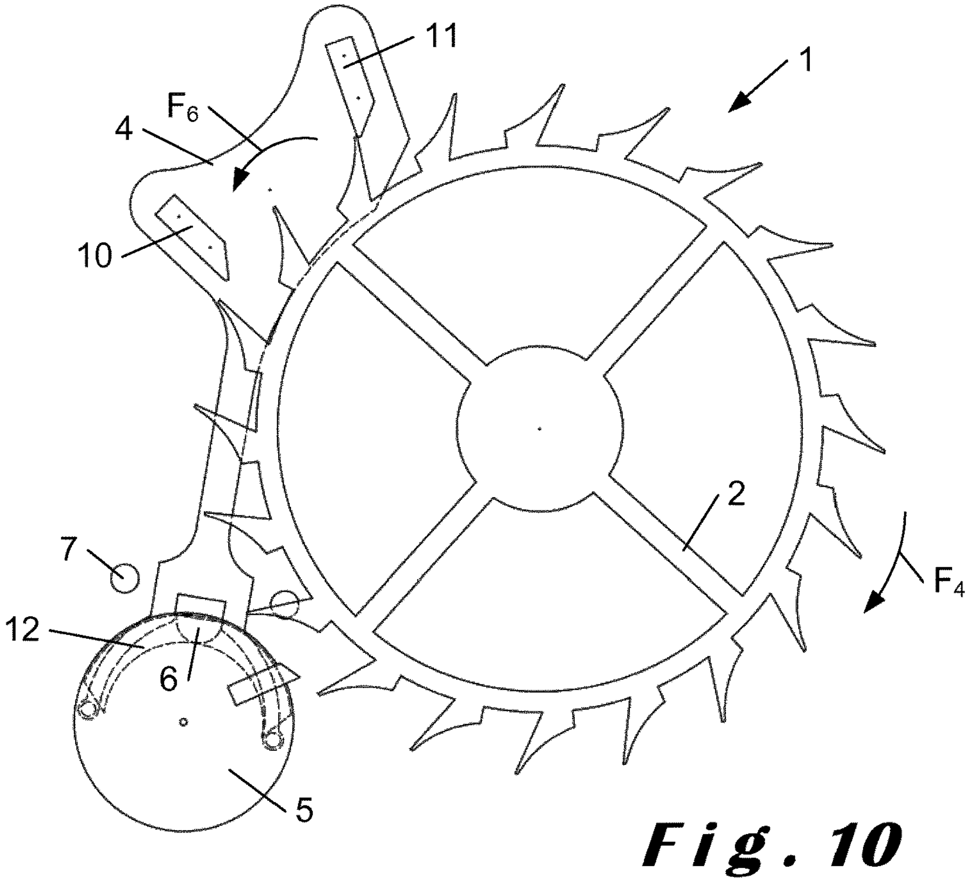
FIGS. 10 to 16 show the various operational phases of the escapement mechanism according to the invention on a second alternation, corresponding to a “coup perdu” (vibration with no impulse)
Figure 11:
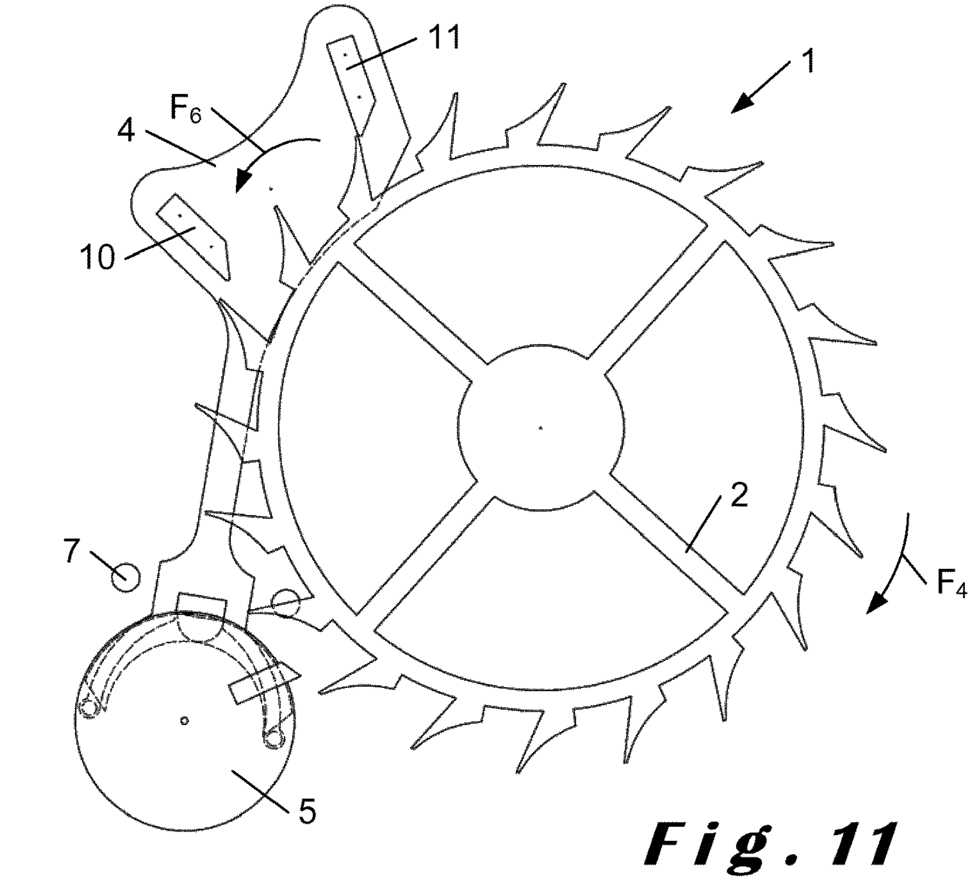
Figure 12:
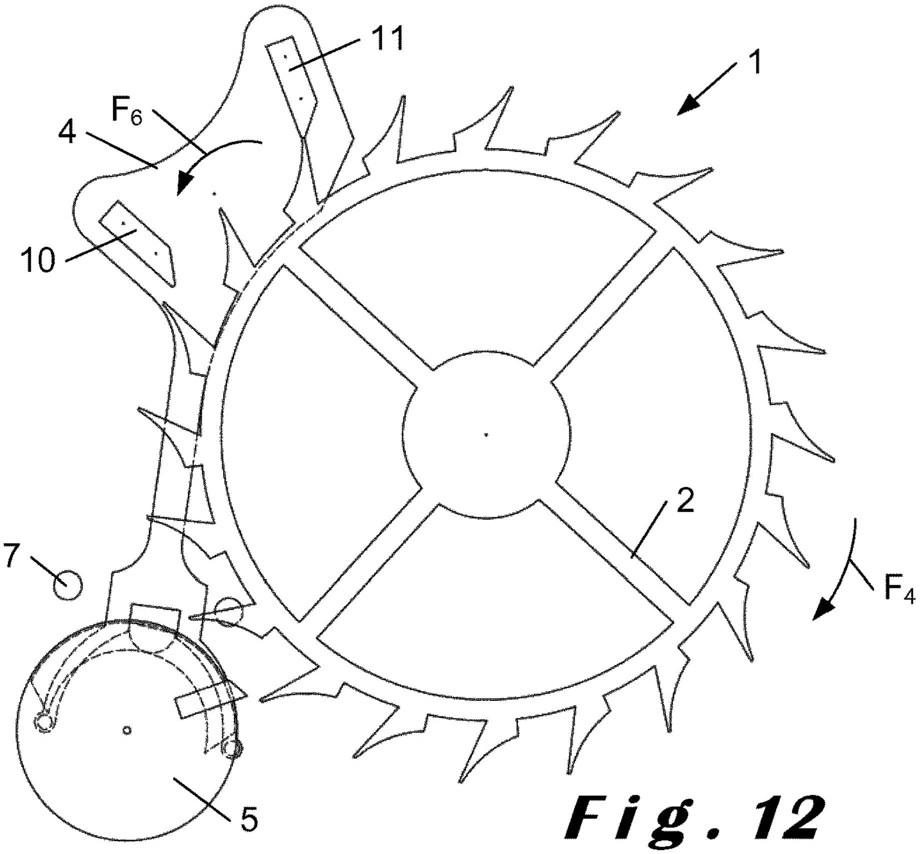
Figure 13:
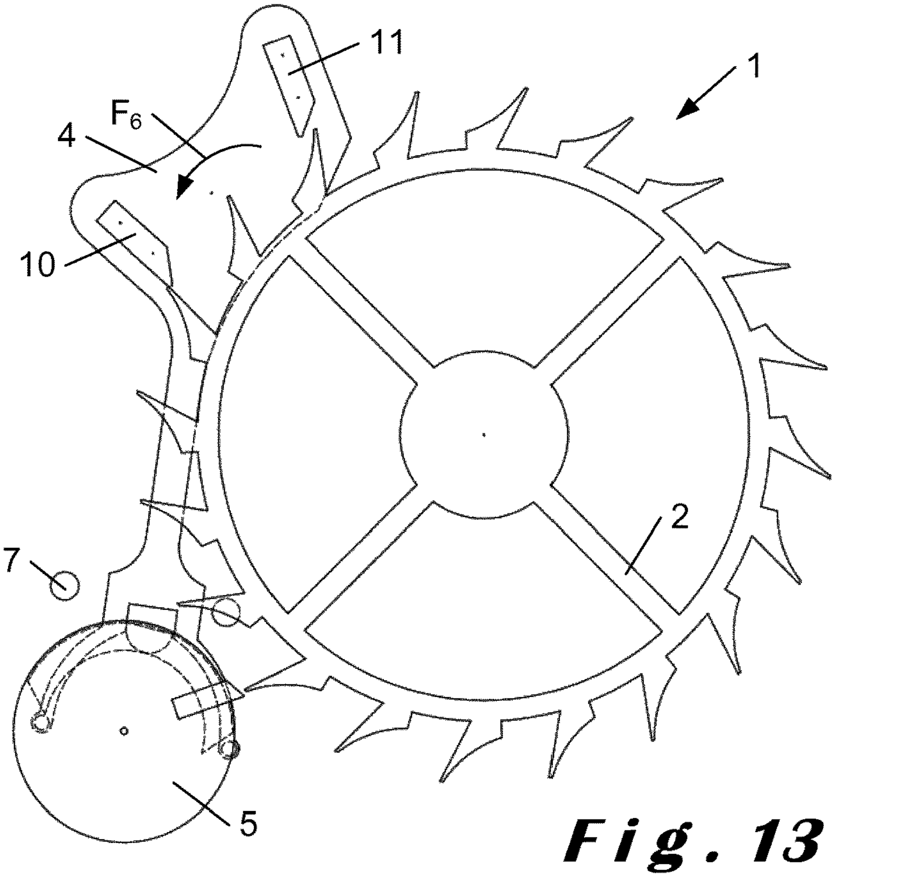
Figure 14:
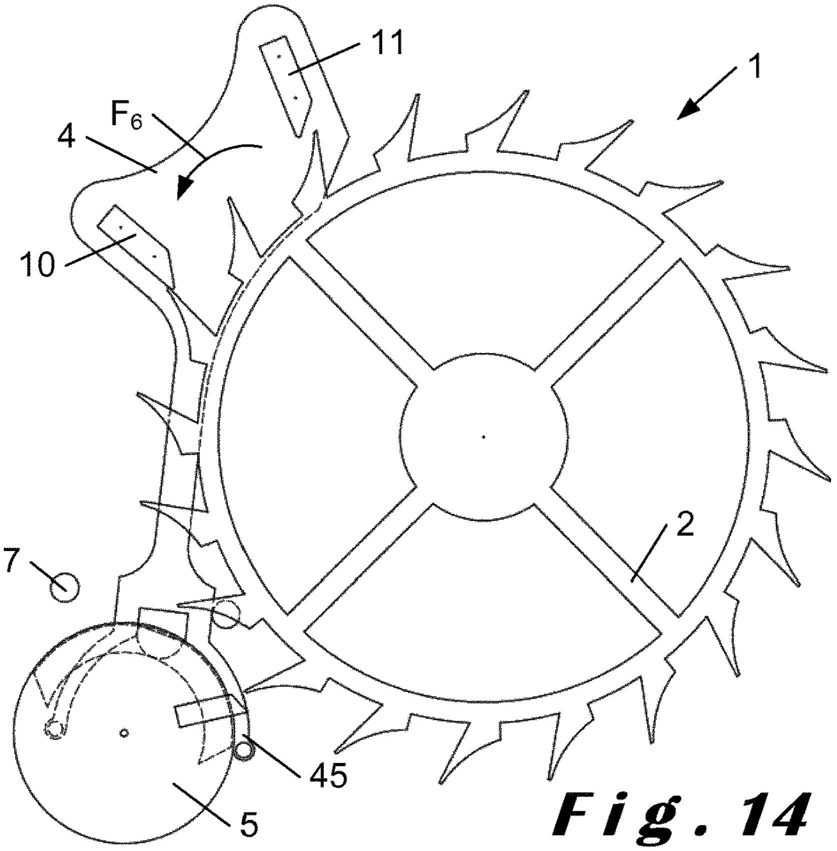
Figure 15:
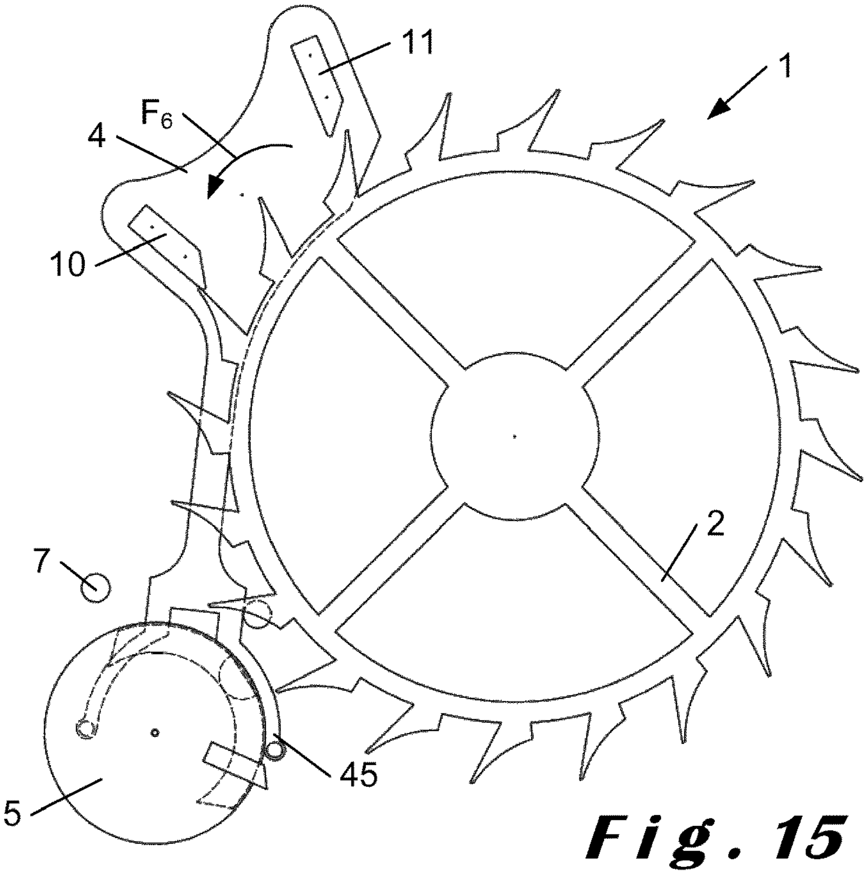

The regulating organ 5 then comes back in the opposite F6 direction towards the unlocking position (FIG. 10) on the second alternation, thus unlocking the anchor 4 of the pin 7, the anchor pivoting in the F5 direction. Then, passing by the dead centre (FIG. 11), it undergoes a second indirect micro-impulse at the exit-pallet 11 (FIG. 12) whereas the escape wheel is freed in rotation in the F4 direction, after which the anchor 4 drops on the pin 8 (FIG. 13), then reaching the second locking position (FIG. 14) where a tooth 3 of the escape wheel comes into abutment on the locking plane of the entry-pallet 10. The regulating organ 5 then continues its travel in the F6 direction by carrying out a "coup perdu" (vibration with no impulse) until the end of its second alternation to then come back in the F1 direction towards the unlocking position in FIG. 4.

The escapement mechanism 1 of the invention therefore offers a direct escapement with a hybrid track having indirect micro-impulses and a slight draw as a Swiss anchor escapement in a direct escapement Robin type configuration without disrupting essentially its performance parameters and advantages but simplifying and increasing its reliability, while offering an optimal operational security.

The invention claimed is:

1. A direct escapement mechanism (1) for a timepiece, comprising:

an escape wheel (2), rotatable about a first axis of rotation (X1) and provided with a series of peripheral teeth (3), each having a locking plane (3*p*), said teeth (3) defining by their ends during rotation of the escape wheel a circular trajectory C, and an anchor (4), rotatable around a second axis of rotation (X3) between two end locking positions delimited by pins (7, 8), said anchor having an entry-pallet (10) and an exit-pallet (11), each having a locking plane (10*p*, 11*p*) and arranged on the anchor in such a way that each pallet cooperates into abutment on its locking plane (10$p$, 11$p$) with the locking plane (3$p$) of a tooth (3) of the escape wheel in each of said locking positions, said anchor (4) further having a fork (43), and at least a further pin (6) which can be rigidly connected to a regulating organ (5) pivoting around a third axis of rotation (X2) to cooperate at each alternation of said regulating organ (5) with the fork (43) of the anchor in order to unlock at least partially said anchor from the escape wheel (2), at least one impulse pallet (9) capable of being rigidly connected to said regulating organ (5) to cooperate with a tooth (3) of the escape wheel to transmit a direct impulse to said regulating organ (5);

wherein at least each tooth (3) of the escape wheel or at least one of the entry-pallets or exit-pallets (11) comprises in the extension of said locking plane (3$p$, 10$p$, 11$p$) an inclined plane (3$i$, 10$i$, 11$i$) having ends which delimit a micro-impulse angle β comprised between 0.5° and 5°, said angle β being considered in relation to said axis of rotation (X3) of the anchor (4), said inclined plane (3$p$, 10$i$, 11$i$) being arranged to provide an indirect impulse to said regulating organ (5) during a movement of said pallet in the path C of the escape wheel (2) by rotating the anchor (4) on its axis (X3).

2. The direct escapement mechanism according to claim 1, wherein said angle β delimited by the ends of said inclined plane (3$i$, 10$i$, 11$i$) is comprised between 0.5° and 2°.

3. The direct escapement mechanism according to claim 1, wherein said inclined plane (3$i$, 10$i$, 11$i$) extends in a secant direction forming an acute angle i comprised between 30° and 70° with said locking plane (3$p$, 10$p$, 11$p$).

4. The direct escapement mechanism according to claim 1, wherein the fork (43) comprises two horns (44, 45) separated by a notch (46) and devoid of a guard pin or the like.

5. The direct escapement mechanism according to claim 4, wherein said horns (44, 45) of the fork (43) are symmetrical in relation to a straight line passing by the axis of rotation (X3) of the anchor and the centre of the notch (46) and extending from said notch (46) following an arc of a circle with a radius of curvature R1 and having at their free end a stud or finger (44$e$, 45$e$) protruding perpendicularly to the median plane of the anchor in which the horns extend.

6. The direct escapement mechanism according to claim 4, further comprising a circular flange (12) attachable to said regulating organ, said flange being centered on the axis of rotation of said regulating organ (5), the further pin (6) being embedded in said flange and movable without contact along an internal face of said horns during the locking phases of the escape wheel.

7. The direct escapement mechanism according to claim 5, wherein the radius of curvature R1 is comprised between 0.5 and 1.5 cm.

8. The direct escapement mechanism according to claim 6, wherein said flange has bevelled free ends in a vertical plane.

9. A timepiece having the direct escapement mechanism (1) according to claim 1, arranged to cooperate with the regulating organ (5) to which said further pin (6) and said impulse pallet (9) are rigidly connected.

10. The timepiece according to claim 9, wherein the regulating organ (5) is a sprung balance or a resonator mounted to move rotatably on a virtual pivot with knives.

11. The direct escapement mechanism according to claim 1, wherein said inclined plane (3$i$, 10$i$, 11$i$) extends in a secant direction forming an acute angle i comprised between 40° and 60° with said locking plane (3$p$, 10$p$, 11$p$).

* * * * *